3,567,505
REACTION FILMS ON GLASS SURFACES
Roy V. Harrington, Corning, N.Y., assignor to
Corning Glass Works, Corning, N.Y.
No Drawing. Filed Feb. 26, 1968, Ser. No. 707,977
Int. Cl. H05b 33/00
U.S. Cl. 117—211                                    13 Claims

ABSTRACT OF THE DISCLOSURE

This invention relates to a method of producing electronically active surface films on a glass substrate by passing a gas containing a reactive anion over the surface of the heated glass substrate which contains a reactive cation and reacting the cation and anion so as to form a film on the surface of the glass substrate, the cations are selected from groups II or III and reacted with anions from groups V or VI respectively, hence either III–V or II–VI compound films can be formed.

BACKGROUND OF THE INVENTION

The production of surfaces having various electronic properties has long been desired. These properties normally include semiconduction, photoconduction, phosphorescence, and fluorescence and can be obtained with various II–VI, III–V, activated II–VI, and activated III–V compounds. One application of such surface is in the production of luminescent screens. These screens emit visible radiation upon excitation by an electrical field. Normally, the screens are placed on a substrate and connected to an electrical circuit which when activated excites the screen so as to produce the visible radiation. These screens have normally been prepared on flat or essentially flat substrates. However, it is desirable to produce these screens on surfaces having various shapes. One of the prime reasons that these screens have been produced on essentially flat surfaces is the method by which the luminescent material has been placed on the surface.

U.S. Pat. No. 2,601,178 teaches a method for producing a fluorescent screen on the inside surface of a cathode ray tube. Basically, the method comprises the steps of immersing the face portion of a cathode ray tube into a zinc chloride bath and then flowing hydrogen sulfide gas into the enclosed envelope portion of the cathode ray tube while applying a voltage between the bath and the enclosed envelope portion of the tube. This treatment causes a reaction of hydrogen sulfide with zinc, in that inner surface of the glass nearest the bath, to produce a zinc sulfide fluorescent surface coating. The problems with such a method are inherently obvious. These consist of the fact that the molten zinc chloride bath must be used, a voltage must be applied across the bath and the inner surface of the cathode ray tube, and that the surface to be coated must be inside an enclosed object, such as a cathode ray tube. Thus, it is seen that this method would not readily lend itself to the production of such films on rod or flat shaped objects which are not hollow. Furthermore, if the zinc chloride bath is not available, or if the voltage is not applied across the bath in the inner surface, there would be no zinc available for reaction with the sulphur; thus, the desired zinc sulfide film could not be produced. Another patent, U.S. No. 2,675,331 teaches a method of vapor phase reacting two constituents and then depositing the product on the glass substrate. The method as described is apparently quite limiting with respect to the size of the substrate that can be used and seems to require the use of a relatively small enclosed evacuated chamber. U.S. Pat. No. 2,983,816 teaches a method of producing a luminescent screen by vacuum evaporation of a fluoride salt onto a glass substrate and the subsequent reaction between the fluoride film and the glass substrate itself. This method produces a complex compound on the surface of the substrate. The desired cation is deposited upon the surface of the substrate in the fluoride salt. This cation then reacts with the oxygen-containing complex ion in the glass so as to form a zinc silicate, zinc borate, or zinc phosphate luminescent surface. It is appreciated that the metal ion, basically, is attacking and reacting with the network former in the glass substrate. Another quite similar method is disclosed in U.S. Pat. No. 3,265,523 wherein a solution containing a halide of the desired metal is atomized and flowed over the surface of a silica-containing glass substrate which has been heated. The silica then reacts with the metal cation so as to form a complex silicate on the surface of the substrate. In both U.S. Pat. Nos. 3,265,523 and 2,983,816, a three element compound is formed with the network forming constituent of the glass.

The advantages of the various III–V and II–VI compounds are known; however, there is no teaching as to how such compounds can easily be formed on a variety of differently shaped glass surfaces. The aforementioned patents normally form complex compounds or have a very elaborate and difficult process by which these compounds are deposited upon a substrate.

SUMMARY

I have found that I can prepare glass substrates having II–VI and III–V compounds thereon by preparing a glass which has at least one desired cation selected from Groups II or III of the Periodic Table, and reacting the surface of the glass with a gas or vapor which contains at least one anion selected from Groups VI and V of the Periodic Table, respectively. By this technique, I can duplicate many of the semiconducting, photoconducting, phosphorescent or fluorescent materials which have been produced by other means. The activator and coactivators which are normally used with these compounds may be included in either the gas or in the glass composition itself or in both. The films thus produced are crystalline and may be produced on a variety of surfaces. Thus, if it is desired to produce a luminescent film on a cylindrical rod or in the bore of a hollow tube, it can easily be done. Furthermore, there is no need to use salt baths, electrical boosts or other auxiliary aids in order to produce these films.

DESCRIPTION OF THE PREFERRED
EMBODIMENT

The reactions which form these desired films are carried out in an enclosed system. I have normally utilized a tube-type furnace into one end of which the reaction gas is passed and through the other end of which the gases may exit. However, other flow-through types of furnaces can be used.

The glasses which I have used are selected such that the desired cation, with which the anion is to react, is the most reducible element in the glass. The determination as to reducibility can be made on the basis of the free energy of formation of the compound. I then select the appropriate network formers and modifiers so that a glass may be produced. In the preferred embodiment, a crucible melt of this glass is made and a gob of that glass is rolled into thin ribbon. Although I prefer to use crucible melts other standard glass manufacturing techniques can be used. I have found that the resultant glasses may be either a clear glass or an opal glass. There is some advantage in preparing an opal glass wherein the opacifying crystals are of the same composition and character as the surface film. In a sense, these opacifying crystals raise the initial level of electronic activity in the glass.

The gases which I use in my invention may be purchased commercially and fed directly into the reaction chamber. However, another alternative would be to generate the desired gas by reacting the necessary materials in a separate chamber and then exhausting the gases from that chamber into the reaction chamber. I have found that it is most convenient to react the desired anion with hydrogen so as to form a hydrogen-anion gas.

In order to assure the appropriate levels of electronic activity, I normally introduce activators and coactivators into the reaction film. The effect of activators and coactivators is well known in the electronic art. I will normally select an activator which can be melted in the glass and which will diffuse into the reaction film during the formation thereof. The coactivators are normally introduced into the film by forming a second gas having as one of its constituents the coactivator and also flow this gas into the reaction chamber.

The film forming takes place over a rather broad range of temperatures, so that the particular temperature selected is not of extreme importance. Normally, these reactions can take place between 400° and 1000° C. The time of reaction is not extremely critical and affects primarily the thickness of the film and the diffusion of the activator into the reaction films. The time and temperature will also affect the surface continuity of the film. It is preferable that the reaction temperatures do not exceed the softening point of the glass as a maximum. The minimum temperature is that where a film will form.

The group III–V compounds which I have been able to prepare include gallium phosphide, gallium arsenide, gallium antimonide, indium phosphide, indium arsenide, and indium antimonide. In order to prepare the gallium-containing reaction films, I first prepared gallium-containing glasses. Satisfactory gallium-containing glasses have been produced in the gallia-soda-silica $$(Ga_2O_3—Na_2O—SiO_2)$$

system. These glasses should have less than 65% by weight of gallia and less than 30% by weight soda. If the composition exceeds the 30% soda, the glass is hygroscopic and if it exceeds 65% gallia, a glass will not form. The addition of 10% $B_2O_3$ to the above system does not change the glass forming regions as defined above. The soda, silica, and boric oxide all have a higher standard of free energy formation than the gallia and hence the gallia will be the most readily reducible, or reactive, species present in this glass. When potash ($K_2O$) was substituted for the soda in the above system, it was found that glasses would not readily form. It was next attempted to flux that system with 10% boric oxide. However, this still did not yield a good glass forming system. The gallia-lime-silica ($Ga_2O_3$—CaO—$SiO_2$) system was next studied and found to have an excellent glass forming region between the 20 and 30 weight percent lime for all ratios of silica and gallia. When a 5% boric oxide flux was added to the above system, it was found that the glass forming region became quite large and included from about 10 to 50 weight percent lime for almost all ratios of gallia and silica. Here again the silica, lime, and boric oxide have a higher energy of formation than that of the gallia. When baria (BaO) or strontia (SrO) are substituted for lime, in both the gallia-lime-silica and gallia-lime-silica-boric oxide systems, the glass forming regions and effects were essentially the same. Systems of gallia-boric oxide-silica and gallia-boric oxide-phosphorus oxide ($P_2O_5$) were not all productive with respect to the formation of the glass.

India ($In_2O_3$) glasses have been prepared in the india-soda-silica ($In_2O_3$—$Na_2O$—$SiO_2$) system. In general, the glass forming regions have been those wherein india was less than 60 weight percent, soda was less than 50 weight percent, and silica was less than 50 weight percent. The addition of 10% by weight of boric oxide has increased the glass forming region. The india-potash-silica $$(In_2O_3—K_2O—SiO_2)$$

system was unable to form a good glass. The addition of 10% boric oxide to that system increased the glass forming region to include most of the high india-containing glasses; that is, those glasses having over 30% india. The india-lime-silica ($In_2O_3$—CaO—$SiO_2$) system had a relatively small glass forming region. The addition of 10% boric oxide to that system substantially increased the glass forming regions. The strontia (SrO) containing glasses again had a relatively small glass forming region; however, the addition of 10% boric oxide substantially increased that glass forming region. A similar situation exists for the baria (BaO) containing india glasses. It is theorized that the size of the indium ion is probably an important factor in determining the glass forming regions for india glasses. Thus, the strontia- and baria-containing glasses are able to take up more india than the soda- or lime-containing glasses.

The gases used in the reactions were either purchased commercially or generated as needed in a separate chamber. An arsenic-containing gas was generated by passing forming gas (8% $H_2$, 92% $N_2$) over elemental arsenic (As) which reacted so as to form the arsine gas ($AsH_3$). The arsine was then passed into the reaction chamber and over the glass so that it would react with the group III element in the glass. The arsine was generated by heating the elemental arsenic to some temperature that would provide a suitable arsenic vapor pressure so that the arsenic vapor could react with the forming gas. This temperature was found to be about 400° C. The arsine gas produced as a result of this reaction was then carried along with the unreacted portion of the forming gas into the reaction chamber. Normally the reaction chamber was at a temperature between 700°–1000° C. The arsine could also be produced by using a carrier gas of 100% pure hydrogen. Phosphine ($PH_3$) was purchased commercially and hence there was no need to form the gas by a reaction. The phosphine was in some cases preheated and also diluted with an inert gas, and then pumped into the reaction chamber. Again, the reaction chamber temperatures were in the 700°–1000° C. range. Stibine ($SbH_3$) is much less stable than arsine or phosphine so that it had to be prepared in a manner similar to that employed for arsine. Elemental antimony (Sb) was reacted with either forming gas or pure hydrogen at approximately 800° C. and the resulting stibine and remaining unreacted hydrogen, or forming gas, was then passed into the reaction chamber where the appropriate glass samples were located.

Gallium arsenide reaction films have been formed using glasses containing from 20–70 weight percent gallia wherein the reaction temperatures varied between 700° and 1000° C. for between 30 and 180 minutes when using pure hydrogen as the carrier gas. In general, as the gallia content of the glass increases, keeping all other parameters constant, the amount of gallia arsenide formed on the surface of the glass will similarly increase. Furthermore, with the larger percentages of gallia, continuous films can be produced in shorter lengths of time. As the reaction temperature increases, the film growth rate also increases. Thus, in some instances where the reaction would be too slow or would not take place at the lower temperatures, say 700° or 800° C., the reaction would take place at the higher temperatures of about 900°–1000° C. Normally, thicker reaction films will form at longer reaction times; however, these longer times will not determine whether or not the reaction film will form in the first place. The carrier gas seems to place a significant role in this reaction in that a pure hydrogen carrier gas consistently yields more reaction and hence better films, than a forming gas under the same conditions. This seems to be related to the fact that the pure hydrogen forms more arsine than the forming gas and thus presents more arsenic for reaction with the glass surface.

The following examples will better illustrate the formation of gallium arsenide reaction films.

EXAMPLE I

Arsine was generated by flowing pure hydrogen gas over elemental arsenic in a tube-type furnace heated to about 400° C. The resultant gas, arsine and excess hydrogen, was exhausted from the furnace and then passed into a second tube-type furnace, or reaction chamber, at the rate of about one liter per minute. The second furnace had been preheated to 700° C. and contained a ¾" chip of glass having the following composition, in weight percent on the oxide basis: 60% $Ga_2O_3$, 10% $SiO_2$, 20% $Na_2O$ and 10% $B_2O_3$. The gas entering the second furnace was exhausted at the same rate at which it entered, one liter per minute, so that this was a flow-through type of system. The process was allowed to run for 4½ hours. The glass was then removed from the furnace and allowed to cool. A gallium arsenide (III–V) film was found to have formed on the surface.

EXAMPLE II

Arsine was generated and passed into the second furnace as in Example I. The second furnace was preheated to 800° C. and it contained a ¾" chip of glass having the following composition, in weight percent on the oxide basis: 30% $Ga_2O_3$, 40% $SiO_2$ and 30% CaO. The gas was also exhausted as in Example I. The process was allowed to run for 30 mintes and the sample was then removed from the furnace and allowed to cool. A gallium arsenide reaction film was found to have formed on the surface. The film had an easily measured resistivity of about 5 megohms.

EXAMPLE III

Arsine was generated by flowing forming gas (8% $H_2$ and 92% $N_2$) over elemental arsenic in a tube-type furnace heated to about 400° C. The resultant arsine, hydrogen, and nitrogen, were exhausted from the furnace and then passed into a second tube-type furnace at the rate of about .75 liter per minute. The second furnace had been preheated to a temperature of about 900° C. and contained a ¾" chip of glass having the following composition, in weight percent on the oxide basis: 50% $Ga_2O_3$, 30% $SiO_2$ and 20% $Na_2O$. The gas was exhausted from the furnace at the same rate at which it entered so that again the system was of the flow-through type. The process was allowed to run for 20 minutes and the glass sample was then removed and cooled. A discontinuous gallium arsenide reaction film was found to have formed on the surface thereof.

EXAMPLE IV

Arsine was again generated as in Example I and the resultant gas flowed into the system as in Example I. The second furnace had been preheated to a temperature of 950° C. and contained a 1" x ½" chip of glass having the following composition, in weight percent on the oxide basis: 65% $Ga_2O_3$, 22% $SiO_2$ and 13% $Na_2O$. As in Example I, gas was exhausted at the same rate that it entered the second furnace. The process was allowed to continue for 3 hours and the glass then removed and cooled. A gallium arsenide reaction film was found to have formed on the surface.

EXAMPLE V

Arsine was generated as in Example I and flowed into and out of the second furnace at the rate of 1 liter per minute. The second furnace was preheated to 1000° C. and contained a 1" x ½" chip of glass having the following composition, in weight percent on the oxide basis: 20% $Ga_2O_3$, 20% $SiO_2$, and 60% BaO. The process was allowed to run for 3 hours and the glass was then removed from the furnace and allowed to cool. A gallium arsenide reaction film was found to have formed on the surface.

Gallium phosphide reaction films have been formed by reacting commercially available phosphine ($PH_3$) at temperatures between 750° and 1000° C. with glasses having from 40 to 75% gallium oxide. Gallium phosphide normally does not form at temperatures less than 750° C. and at temperatures above 1000° C., the gallium phosphide which forms decomposes very rapidly. Normally, long single crystals of gallium phosphide will form on the surface rather than a uniform coating. However, it was possible to form a platelet crystal on the surface of some of the gallium-containing glasses. In order to suppress the growth of these needle-like crystals and to produce the platelet crystals, the phosphine is diluted with an inert gas, such as argon. This dilution does suppress the needle-like growth. However, since there is only a small amount of phosphorus available for reaction, the total amount of platelet crystals which are grown is about the same as the amount grown without the use of a diluent gas. Phosphine can also be produced by a reaction similar to that used in producing arsine. There was no demonstrable difference between the crystal growth that resulted from producing phosphine in this manner and the phosphine purchased commercially.

The following examples will better illustrate the formation of gallium phosphide reaction films.

EXAMPLE VI

Phosphine was purchased commercially and flowed into a tube-type furnace at the rate of about 100 milliliters per minute. The furnace was preheated to 750° C. and contained a 1" x ½" chip of glass having the following composition, in weight percent on the oxide basis: 60% $Ga_2O_3$, 10% $SiO_2$, 10% $B_2O_3$ and 20% $Na_2O$. The gas was exhausted from the furnace at the same rate at which it was fed into it, so that the system was of the flow-through type. The process was allowed to run for 30 minutes and the glass was then removed from the furnace and cooled. A gallium phosphide film was found to have formed on the surface.

EXAMPLE VII

Elemental phosphorus was dispersed in phopshine gas as it was flowed into a furnace. The total gas was then flowed into a second furnace at the rate of 100 milliliters per minute of phosphine and 10 milligrams per minute of elemental phosphorus. The gas was removed from the second furnace at about the same rate. This second furnace had been preheated to a temperature of 750° C. and contained a 1" x ½" chip of glass having the following composition in weight percent on the oxide basis: 40% $Ga_2O_3$, 45% $SiO_2$ and 15% BaO. The process was allowed to run for 30 minutes and the glass was then removed and cooled. A gallium phosphide film was found to have formed on the surface of the glass.

EXAMPLE VIII

Commercially available phosphine was fed into a furnace at a rate of 200 milliliters per minute and exhausted from the furnace at the same rate. The furnace had been preheated to 950° C. and contained a 1″ x ½″ chip of glass having the following composition in weight percent on the oxide basis: 65% $Ga_2O_3$, 22% $SiO_2$ and 13% $Na_2O$. The process was allowed to run for 30 minutes after which the glass was then removed and cooled. A gallium phosphide film was found to have formed on the surface.

Stibine ($SbH_3$) was produced in a manner similar to that for arsine and the stibine was found to react with glasses having from 40 to 70% gallium oxide therein. These reactions occurred at temperatures between 700°–800° C. In addition to using hydrogen as the carrier gas, forming gas was used successfully.

The following example will better illustrate the formation of gallium antimonide reaction films.

EXAMPLE IX

Stibine was generated by flowing pure hydrogen over elemental antimony in a tube-type furnace heated to about 400° C. The resultant stibine gas and excess hydrogen was exhausted from the furnace and then passed into a second tube-type furnace at the rate of about 1 liter per minute. The second furnace had been preheated to about 800° C. and contained a 1″ x ½″ chip of glass having the following composition in weight percent on the oxide basis: 70% $Ga_2O_3$, 10% $SiO_2$ and 20% $K_2O$. The gas was exhausted from the furnace at the rate of 1 liter per minute so that the system was of the flow-through type. The process was allowed to run for three hours. The glass sample was then removed and allowed to cool. A gallium antimonide film was found to have formed on the surface of the glass.

Indium arsenide was prepared by the same method used to prepare gallium arsenide. Indium arsenide will form on glasses containing from about 20 to 40 weight percent indium oxide. The reaction temperatures will range from about 700°–950° C. Again, as in the case of gallium arsenide either forming gas or hydrogen can be used as the carrier gas. However, hydrogen is preferred since its use results in better films. In general, the films produced with the indium glasses were not as dense nor as thick as those produced when using the gallium gases. This could be due to the lower concentration of indium in these glasses as compared to the concentration of gallium in the aforementioned glasses. Another reason could be the lower mobility of the larger indium ion.

The following examples will better illustrate the formation of indium arsenide reaction films.

EXAMPLE X

Arsine was generated by flowing forming gas over elemental arsenic in a tube-type furnace heated to about 400° C. The resultant arsine, hydrogen, and nitrogen were exhausted from the furnace and then passed into a second tube-type furnace at the rate of about 1 liter per minute. The second furnace was preheated to 700° C. and contained a 1″ x ½″ chip of glass having the following composition in weight percent on the oxide basis: 40% $In_2O_3$, 35% $SiO_2$, 15% $Na_2O$ and 10% $B_2O_3$. The gas was exhausted from the second furnace at the rate of 1 liter per minute so that the system was of the flow-through type. The process was allowed to run for 2½ hours after which the glass was removed and cooled. An indium arsenide film was found to have formed on the surface of the glass.

EXAMPLE XI

Arsine was generated as in Example X and passed into the second furnace at the rate of 1 liter per minute. The second furnace was in this case preheated to 800° C. and contained at 1″ x ½″ chip of glass having the following composition in weight percent on the oxide basis: 40% $In_2O_3$, 40% $SiO_2$ and 20% CaO. The gas was also exhausted from the second furnace at the rate of 1 liter per minute so that the system was of the flow-through type. The process was allowed to run for two hours and thereafter the glass was removed and allowed to cool. An indium arsenide film was found to have formed on the glass surface.

EXAMPLE XII

Arsine was generated by flowing pure hydrogen gas over elemental arsenic in a tube-type furnace heated to about 400° C. The resultant arsine and excess hydrogen were exhausted from the furnace and then passed into a tube-type furnace at the rate of about 1 liter per minute. The second furnace had been preheated to 800° C. and contained a 1″ x ½″ chip of glass having the following composition in weight percent on the oxide basis: 20% $In_2O_3$, 40% $SiO_2$ and 40% BaO. The gas was exhausted from the second furnace at a rate of 1 liter per minute so that system was of a flow-through type. The process was allowed to run for 30 minutes and thereafter the glass was removed and allowed to cool. An indium arsenide film was found to have formed on the surface of the glass.

EXAMPLE XIII

Arsine was generated and passed into the second furnace as in Example XII. The second furnace was preheated to 950° C. and contained a chip of glass having the same composition as that in Example XII. The process was allowed to run for 30 minutes and thereafter the glass was removed from the furnace and allowed to cool. An indium arsenide film had formed on the surface of the glass.

Indium phosphide was produced by reacting the various indium-containing glasses with phosphine in a manner similar to that used in producing gallium phosphide. Normally, the indium phosphide formation was less than that for gallium phosphide. However, the resultant film was usually fine-grained and did not have the needle-like structure associated with the gallium phosphide. The indium glasses which did produce these films varied from about 20–60 weight percent indium oxide. The reaction temperatures varied from between 750° to 1000° C.

The following examples will better illustrate the formation of indium phosphide reaction films.

EXAMPLE XIV

Phosphine was purchased commercially and flowed into a tube-type furnace at the rate of about 100 milliliters per minute. The furnace had been preheated to a temperature of 750° C. and contained at 1″ x ½″ chip of glass having the following composition, in weight percent on the oxide basis: 20% $In_2O_3$, 15% $SiO_2$, 10% $B_2O_3$ and 55% BaO. The process was allowed to run for 40 minutes and thereafter the glass was removed from the furnace and allowed to cool. An indium phosphide film was found to have formed on the surface of the glass.

EXAMPLE XV

As in Example XIV, phosphine was flowed into a tube-type furnace at the rate of about 300 milliliters per minute. The furnace had been preheated to 1000° and contained a 1″ x ½″ chip of glass having the following composition, in weight percent on the oxide basis: 40% $In_2O_3$, 30% $SiO_2$ and 30% SrO. The gas was also exhausted from the furnace at the rate of 300 milliliters per minute so that this was a flow-through type system. The process was allowed to run for 30 minutes and thereafter the glass was removed and cooled. An indium phosphide film was found to have formed on the surface of the glass.

EXAMPLE XVI

As in Example XIV, phosphine was flowed into a tube-type reaction furnace at the rate of about 100 milliliters per minute. The furnace had been preheated to 1000° C. and contained a 1″ x ½″ chip of glass having the following composition in weight percent on the oxide basis: 60% $In_2O_3$, 15% $SiO_2$, 10% $B_2O_3$ and 15% SrO. The gas was exhausted from the furnace at a rate of about 100 milliliters per minute so that the system was of the flow-through type. The process was allowed to run for 30 minutes and the glass was then removed and allowed to cool. An indium phosphide film was found to have formed on the surface of the glass.

Indium antimonide was produced by reacting the indium-containing glasses with stibine as produced above. The glass compositions in which the indium and antimonide were produced range from 30–40 weight percent indium oxide and the reaction temperature was between 700°–800° C. Although films were deposited, they were rather discontinuous.

EXAMPLE XVII

Stibine was generated by flowing pure hydrogen over elemental antimony in a tube-type furnace heated to about 400° C. The resultant stibine gas and excess hydrogen was exhausted from the furnace and then passed into a second tube-type furnace at the rate of 1 liter/minute. The second furnace had been preheated to about 800° C. and contained a 1″ x ½″ chip of glass having the following composition in weight percent on the oxide basis: 40% $In_2O_3$, 40% $SiO_2$ and 20% CaO. The gas was exhausted from the furnace at the rate of 1 liter/minute so that the system was of the flow-through type. The system was allowed to run for three hours. The glass sample was then removed from the furnace and allowed to cool. An indium antimonide film was found to have formed on the surface of the glass.

The group II–VI compounds which I have prepared include zinc sulfide, zinc selenide, cadmium sulfide, strontium sulfide, and cadmium selenide. As before, the group II elements were incorporated in glasses wherein the group II elements were the most easily reducible elements in the glass. Satisfactory cadmium-containing glasses have been produced in the cadmium oxide-silica-alumina

$(CdO—SiO_2—Al_2O_3)$ system. Zinc-containing glasses were produced in the zinc oxide-alumina-boric oxide-silica

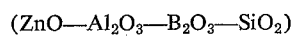
$(ZnO—Al_2O_3—B_2O_3—SiO_2)$ system. Similarly, satisfactory strontium-containing glasses were prepared in the strontia-alumina-boric oxide-silica $(SrO—Al_2O_3—B_2O_3—SiO_2)$ system. Various amounts of activators can be added to the base glass during melting. The typical activators which can be used are copper, silver, indium, and lead. Small amounts of other property modifying constituents may also be added to the base glass. For example, $P_2O_5$ may be added in any of the aforementioned systems to soften the base glass. However, the effect of the base composition on the production of the reaction films has been very small. The only real effect is that the increasing amount of cadmium available for reaction produces better, heavier, and thicker films.

The reactive anion can be carried into the reaction chamber as a gas such as hydrogen sulfide ($H_2S$) and hydrogen selenide ($H_2Se$) or may be evaporated from a container within the reaction chamber. Hydrogen sulfide and hydrogen selenide may be either generated in the known manner or purchased commercially. In addition to the reactive anion being present in the reaction chamber, a small amount of a coactivator may be fed, in a gaseous form, into the system.

In the cadmium oxide-boric oxide system, minor amounts of sulphur have been added. In that system, the addition of more than 6% sulphur produces an opal glass which has cadmium sulfide crystals therein. If sulphur is present in amounts less than 6%, the glass produced will be clear. Furthermore, it has been found that the glasses containing over 6% sulphur would upon melting form two immiscible liquids, and when cooled the liquids would separate and one would crystallize to a predominantly cadmium sulfide opal and the other liquid to a predominantly boric oxide glass. The boric oxide glass is very soluble in water and very readily disintegrates therein. However, when the sulphur content was below the 6% and a clear glass is produced, there are no problems with immiscibility or phase separation. In the case of the opal glass, the boric oxide glass was separated therefrom, and tests were run utilizing just the cadmium sulfide opal glass. Satisfactory glasses were formed in the cadmium oxide-boric oxide system wherein the cadmium oxide was present between 40 and 80 weight percent and the boric oxide between about 20 and 45 weight percent. In the cadmium oxide-silica-alumina system, the cadmium oxide was present from between 60 and 80 weight percent with the silica being between 10 and 20 weight percent.

In the zinc oxide-alumina-boric oxide-silica system satisfactory glasses were formed in the following composition ranges: from 30% to 70% zinc oxide, from 5% to 20% alumina, from 0% to 30% boric oxide, from 0% to 50% silica, and the minor amounts of modifiers and activators. The addition of sulphur in this zinc oxide system will cause the glass to form a zinc sulfide opal similar to the cadmium sulfide opal which is formed above. The composition ranges for the strontia-alumina-boric oxide-silica system are similar to those in the cadmium oxide and zinc oxide system.

Cadmium sulfide and zinc sulfide films were formed on the appropriate glass substrates by heating the substrate in a tube-type furnace to a temperature between 400° and 700° C. and thereafter flowing the reactive gas and the coactivator containing gas into the system. The ratio of reactive gas to coactivator gas has been varied 100:0 to 1:1; however, I have found that the most effective ratio is 99:1. If the reactions take place at a temperature less than about 400° C. the films thus produced are too thin. If the reaction takes place much above 700° C. blistering and distortion of the film and glass will result. The optimum firing temperatures have been shown to be between 600° and 700° C. The optimum firing time for the preferred firing temperatures are from 15 to 45 minutes. If the time is less than 15 minutes, a discontinuous film will form; if the time is greater than 45 minutes; there is no appreciable change in properties. The length should be sufficiently long to allow a continuous film to form and to allow a sufficient amount of the activator to diffuse into the reaction film.

Strontium sulfide films are formed in the appropriate glass substrates by heating the substrate in a tube-type furnace to a temperature about 850° C. The minimum firing temperature is believed to be about the same as that for the zinc sulfide and cadmium sulfide films. As before, the firing schedules should be sufficiently long to allow a continuous film to form and to allow a sufficient amount of the activatior to diffuse into the reaction film.

EXAMPLE XVIII

A glass having the following composition, in weight percent on the oxide basis, was prepared: 58% CdO, 21.4% $B_2O_3$, 4.3% $P_2O_5$, 3.4% $CdCl_2$, 0.1% $CuCl_2$ and 12.8% S. This glass was an opal. A 1″ x ½″ chip of the glass was placed in a tube-type furnace which had been preheated to 400° C. A gas containing, on the volume basis, 99% $H_2S$ and 1% HCl was then flowed into the furnace. The reaction was allowed to continue for 45 minutes and thereafter the sample was removed from the furnace and cooled to room temperature. A cadmium sulfide reaction film was found to have formed and the film was found to be a photoconductor.

EXAMPLE XIX

A glass having the following composition, in weight percent on the oxide basis, was prepared: 63.6% ZnO, 13.7% $B_2O_3$, 4.6% $P_2O_5$, 4.6% $SiO_2$, 4.6% $Al_2O_3$, 0.1% $ZnCl_2$, .1% CuO and 9.1% S. This glass was a white opal. A 1" x ½" chip of this glass was closed in a tube-type furnace which had been preheated to 720° C. A gas containing, on the volume basis, 99% $H_2S$ and 1% HCl was flowed into the furnace. The reaction was allowed to continue for 45 minutes and thereafter the sample was removed from the furnace and cooled to room temperature. A zinc sulfide reaction film was found to have formed and the film was found to be both photoluminescent and electroluminescent.

EXAMPLE XX

A glass having the following composition, in weight percent on the oxide basis, was prepared: 5% $Al_2O_3$, 15% $B_2O_3$, 5% $P_2O_5$, 5% $SiO_2$, 70% SrO and about .01% MnO. This glass was clear in appearance. A small chip of this glass was placed in a tube-type furnace which had been preheated to 840° C. Pure $H_2S$ was flowed into the furnace and the reaction was allowed to continue for 1 hour. Thereafter the sample was removed from the furnace and cooled to room temperature. A strontium sulfide reaction film was found to have formed and the film was photoluminescent. Upon exposure to radiation of 3660 A., the film exhibited a bright yellow color. After removal of the radiation, there was a faint phosphorescence.

Comparable selenium-containing reaction films can be made by substituting $H_2Se$ gas for the $H_2S$ gas in the above examples. Similar films with similar properties will result from a substitution. In addition to using $H_2Se$ to carry the reactive, Se direct vaporization can be used.

EXAMPLE XXI

A glass having the following composition, in weight percent, was prepared: 9.6% $SiO_2$, 9.6% $Al_2O_3$, 76.8% CdO, 3.9% $CdCl_2$ and .1% $CuCl_2$. A small piece of this glass was placed in a tube-type furnace along with 0.5 gram of selenium. The furnace was sealed and heated to 600° C. and held thereat for 1 hour. The furnace and samples were then cooled to ambient temperature. A reaction film of CdSe was found to have formed on the glass surface.

Although all of the foregoing examples disclose films formed by the reaction of one anion with one cation, it is possible to utilize a system wherein more than one film forming cation is in the glass and more than one anion is reacted therewith. Thus, more complex reaction films may be formed.

These reaction films can be electrically connected to a circuit so as to form a circuit element. Based upon the electrical properties of these films, the circuit element can be a semiconductor, photoconductor, luminescent screen, etc.

I claim:
1. A method of manufacturing an electronically active crystalline film in the surface of a glass comprising the steps of:
  (a) preparing a silicate glass containing film forming cations of at least one element selected from the group consisting of cadmium, strontium, zinc, gallium, and indium, said film forming cations being the most readily reducible cations in the glass and being present in the indicated proportions as calculated from the batch in weight percent on the oxide basis, of about 30–80% CdO, 30–80% ZnO, 30–80% SrO, 20–75% $Ga_2O_3$ and 20–60% $In_2O_3$, the total of said oxides being not more than about 80%;
  (b) heating said glass to a temperature between 400° and 1000° C.; and
  (c) contacting the surface of said glass with a gaseous source of film forming anions of at least one element selected from the group consisting of antimony, phosphorus, and arsenic when gallium and/or indium constitutes the readily reducible cation, and film forming anions of at least one element selected from the group consisting of sulfur and selenium when cadmium, strontium, and/or zinc constitutes the readily reducible cation, said contact being undertaken under reducing conditions to react said anions with said cations and thereby form an electronically active film in the surface of said glass composed of crystals selected from the group consisting of gallium antimonide, gallium phosphide, gallium arsenide, indium antimonide, indium phosphide, indium arsenide, cadmium sulfide, cadmium selenide, strontium sulfide, strontium selenide, zinc sulfide, and zinc selenide.

2. The method of claim 1 wherein said source of film forming anions consists of a gaseous compound of the desired film forming anion, such compound being selected from the group consisting of phosphine, arsine, stibine, hydrogen sulfide, and hydrogen selenide.

3. The method of claim 1 wherein said silicate glass is a glass in the $R_2O_3$—$Na_2O$ and/or RO—$SiO_2$ composition system, with $R_2O_3$ being at least one oxide selected from the group consisting of $Ga_2O_3$ and $In_2O_3$ and RO being at least one oxide selected from the group consisting of CaO, BaO, and SrO.

4. The method of claim 3 wherein said silicate glass consists essentially, in weight percent on the oxide basis as calculated from the batch, of 20–75% $Ga_2O_3$, 0–10% $B_2O_3$, and at least one oxide selected from the group consisting of 10–30% $Na_2O$, 15–60% BaO, 20–30% CaO and 20–30% SrO, with the remainder of the glass being silica.

5. The method of claim 3 wherein said silicate glass consists essentially, in weight percent on the oxide basis as calculated from the batch, of 20–60% $In_2O_3$, 0–10% $B_2O_3$, and at least one oxide selected from the group consisting of 15–50% $Na_2O$, 40–55% BaO, 20–30% CaO and 15–30% SrO, with the remainder of the glass being silica.

6. The method of claim 1 wherein said silicate glass is a glass in the RO—$Al_2O_3$—$B_2O_3$—$SiO_2$ composition system, with RO being at least one oxide selected from the group consisting of SrO and ZnO.

7. The method of claim 6 wherein said silicate glass consists essentially, in weight percent on the oxide basis as calculated from the batch, of 30–70% RO, wherein RO is at least one oxide selected from the group consisting of ZnO and SrO, 5–20% $Al_2O_3$, 0–30% $B_2O_3$ and 0–5% $P_2O_5$, with the remainder of the glass being silica.

8. The method of claim 7 wherein strontium constitutes said film forming cation, and wherein said silicate glass also contains in weight percent on the oxide basis as calculated from the batch, 0–0.01% MnO.

9. The method of claim 7 wherein zinc constitutes said film forming cation and wherein said silicate glass also contains in weight percent as calculated from the batch, 0–0.1% CuO, 0–0.1% $ZnCl_2$ and 0–10% S.

10. The method of claim 1 wherein said glass is a glass in the CdO—$Al_2O_3$—$SiO_2$ composition system.

11. The method of claim 10 wherein said silicate glass consists essentially, in weight percent on the oxide basis as calculated from the batch, of about 60–80% CdO, 10–20% $SiO_2$ and 5–30% $Al_2O_3$.

12. A method of manufacturing an electronically active crystalline film in the surface of a glass comprising the steps of:
  (a) preparing a glass in the CdO—$B_2O_3$ composition system wherein cadmium provides film forming cations and which are the most readily reducible cations in the glass, said glass containing, in weight percent on the oxide basis as calculated from the batch, about 40–80% CdO;
  (b) heating said glass to a temperature between 400° 1000° C.; and
  (c) contacting the surface of said glass under reducing conditions with a gaseous source of film forming anions of at least one element selected from the group consisting of sulfur and selenium so as to react said anions with said cations and thereby form an electronically active film in the surface of said glass composed of crystals selected from the group consisting of cadmium sulfide and cadmium selenide.

13. The method of claim 12 wherein said glass consists essentialy, in weight percent on the oxide basis as calculated from the batch, of about 40-80% CdO, 20-45% $B_2O_3$ and 0-5% $P_2O_5$, and wherein the said film forming anion is reacted with the film forming cation in the glass by contacting the surface of the glass with a gaseous compound of the desired film forming anion selected from the group consisting of hydrogen sulfide and hydrogen selenide.

References Cited

UNITED STATES PATENTS

| 2,983,816 | 5/1961 | Koller | 117—54X |
| 3,265,523 | 8/1966 | Schulman et al. | 117—104X |

ALFRED L. LEAVITT, Primary Examiner

W. F. CYNON, Assistant Examiner

U.S. Cl. X.R.

117—33.5, 213, 229